US010384829B2

(12) United States Patent
Hacikyan

(10) Patent No.: US 10,384,829 B2
(45) Date of Patent: Aug. 20, 2019

(54) WATER-DEGRADABLE CARRIER FOR CAUSTIC SUBSTANCES AND RELATED MANUFACTURING METHOD

(71) Applicant: Michael Hacikyan, Naples, FL (US)

(72) Inventor: Michael Hacikyan, Naples, FL (US)

( * ) Notice: Subject to any disclaimer, the term of this patent is extended or adjusted under 35 U.S.C. 154(b) by 242 days.

(21) Appl. No.: 15/392,084

(22) Filed: Dec. 28, 2016

(65) Prior Publication Data

US 2018/0178960 A1  Jun. 28, 2018

(51) Int. Cl.
| | | |
|---|---|---|
| *B32B 1/02* | (2006.01) | |
| *B65D 5/56* | (2006.01) | |
| *B31C 3/00* | (2006.01) | |
| *E21B 27/00* | (2006.01) | |
| *B65D 65/46* | (2006.01) | |
| *B65D 65/40* | (2006.01) | |
| *B65D 65/42* | (2006.01) | |
| *E21B 27/02* | (2006.01) | |
| *B32B 1/08* | (2006.01) | |
| *E21B 27/04* | (2006.01) | |
| *B65D 3/04* | (2006.01) | |
| *B65D 59/04* | (2006.01) | |
| *E21B 43/12* | (2006.01) | |

(52) U.S. Cl.
CPC .................. *B65D 5/56* (2013.01); *B31C 3/00* (2013.01); *B32B 1/02* (2013.01); *B32B 1/08* (2013.01); *B65D 3/04* (2013.01); *B65D 5/563* (2013.01); *B65D 5/566* (2013.01); *B65D 59/04* (2013.01); *B65D 65/40* (2013.01); *B65D 65/42* (2013.01); *B65D 65/46* (2013.01); *E21B 27/00* (2013.01); *E21B 27/02* (2013.01); *E21B 27/04* (2013.01); *E21B 43/121* (2013.01)

(58) Field of Classification Search
CPC .......... B65D 5/56; B65D 5/563; B65D 5/566; B65D 65/40; B65D 65/42; B65D 65/46; B32B 1/02; B32B 1/08; B31C 3/00; E21B 27/00; E21B 27/02; E21B 27/04
See application file for complete search history.

(56) References Cited

U.S. PATENT DOCUMENTS 6,446,794 B1    9/2002  Hacikyan

OTHER PUBLICATIONS

Anonymous, "Water Soluble Paper Soap Stick Tubes", Junction Tool Supplies Pty. Ltd., Pipe Tools Australia, at least as early as Dec. 2014, 1 page.

*Primary Examiner* — Walter Aughenbaugh
(74) *Attorney, Agent, or Firm* — Walter W. Duft

(57) ABSTRACT

A water-degradable carrier for holding a caustic substance includes a tube having a first end, a second end, and a hollow interior disposed between the first and second ends. The tube may be formed from a water-degradable material and have overlapping self-adhered windings. The water-degradable material may include a water-degradable paper layer and a chemical-resistant water-degradable film layer that acts as an adhesive when wetted to adhere together the windings. The chemical-resistant water-degradable film layer is selected from a material that is resistant to a caustic substance that is to be carried by the carrier and acts as a barrier to substantially prevent the caustic substance from degrading the water-degradable paper layer and leaking out of the tube.

21 Claims, 2 Drawing Sheets

WATER-DEGRADABLE CARRIER FOR CAUSTIC SUBSTANCES AND RELATED MANUFACTURING METHOD

BACKGROUND

1. Field

The present disclosure relates generally to water-degradable carriers for holding caustic substances. More particularly, the disclosure is directed to water-degradable surfactant carriers, such as soap sticks for gas well reclamation.

2. Description of the Prior Art

By way of background, water-degradable carriers for holding various types of caustic substances are known. Soap sticks for gas well reclamation are one example. As a gas well matures, fluid can load up downhole because the gas pressure is no longer sufficient to generate the production velocity needed to carry the fluid to the surface. This can slow down or even stop gas well production. To remedy this situation, soap sticks are sometimes introduced into the well to agitate and foam the fluid. This allows the gas pressure to unload the fluid to the surface and thereby restore well productivity.

A conventional soap stick is constructed as a spiral wound tube approximately 16 inches in length that is filled with a surfactant material. The tube is constructed from water-soluble paper windings bound together using a water-soluble adhesive that is applied to strips of the paper (by dipping or spraying) as the paper is wound onto a mandrel to form the tube. Heat-softened surfactant is thereafter introduced into the tube and allowed to cool and harden. When the soap stick is introduced into a gas well, the water-soluble paper and adhesive rapidly dissolve in the well fluid in order to quickly release the surfactant.

A disadvantage of conventional soap sticks is that the hot liquid surfactant is caustic with respect to the water-soluble paper and adhesive. As such, the surfactant can degrade and leach through the tube wall, particularly at the spiral seams of the tube, before it cools and hardens. This may require that the temperature of the surfactant be reduced, making it more viscous and correspondingly increasing the time required to flow the surfactant into the tube. Even after cooling, the surfactant may continue to sweat, bleed or ooze out through the tube wall over over time. This leakage of surfactant through the tube wall is undesirable because it creates shipping, storage and usage problems. Similar problems can arise when water-degradable carriers are used for other substances that are caustic with respect to the material(s) used to construct the carrier.

A further disadvantage of conventional soap sticks arises from the use of plugs to block one or both ends of the tube. In some cases, the plugs are formed from salt. Such plugs can absorb atmospheric moisture over time, causing the salt to prematurely degrade the water-soluble paper used to form the tube. In other cases, the plugs are formed from polyethylene oxide, a water-soluble polymer. Such plugs must be glued in place, which adds material cost. Also, soap sticks are typically introduced into a gas well using a mechanical launcher device that periodically releases soap sticks in an automated manner. After a soap stick is loaded into the launcher, it may be some time before the soap stick is actually released into the gas well. During this time, heat within the launcher can soften or melt the soap stick's polyethylene oxide plug, causing plug material and surfactant to foul the launcher's release valve.

SUMMARY

A water-degradable carrier for holding a caustic substance includes a tube having a first end, a second end, and a hollow interior disposed between the first and second ends. The tube may be formed from a water-degradable material and have overlapping self-adhered windings. The water-degradable material may include a water-degradable paper layer and a chemical-resistant water-degradable film layer that acts as an adhesive when wetted to adhere together the windings. The chemical-resistant water-degradable film layer is selected from a material that is resistant to a caustic substance to be carried by the carrier and acts as a barrier to substantially prevent the caustic substance from degrading the water-degradable paper layer and leaking out of the tube.

In an embodiment, an end closure made from the water-degradable material may be disposed at the first or second end of the tube to block the caustic substance from escaping therefrom.

In an embodiment, the paper layer may include water-soluble paper.

In an embodiment, the chemical-resistant water-degradable film layer may include a water-soluble polymer.

In an embodiment, the chemical-resistant water-degradable film layer may include a synthetic water-soluble polymer selected from the group consisting of polyvinyl alcohol, cellulose ethers, methylcellulose, carboxymethylcellulose, and polyvinylpyrrolidone.

In an embodiment, the chemical-resistant water-degradable film layer may include polyvinyl alcohol.

In an embodiment, the chemical-resistant water-degradable film layer may include a stretchable polymeric film bonded to the water-degradable paper layer.

In an embodiment, the water-degradable material may include a laminate of the water-degradable paper layer and the chemical-resistant water-degradable film layer.

In an embodiment, the water-degradable material may include a co-extrusion of the water-degradable paper layer and the chemical-resistant water-degradable film layer.

In an embodiment, the water-degradable material may include the chemical-resistant water-degradable film layer coated on the water-degradable paper layer.

In another aspect, a method for manufacturing a water-degradable caustic substance carrier may include providing a water-degradable material having a water-degradable paper layer and a chemical-resistant water-degradable film layer that acts as an adhesive when wetted, wetting the chemical-resistant water-degradable film layer to create a wetted water-degradable material that is tacky on one side, and forming the wetted water-degradable material into a wound tube having a first end, a second end, and a hollow interior disposed between said first and second ends. The tube has overlapping self-adhered windings of the water-degradable material. The tacky side of the water-degradable material faces toward the hollow interior so that the chemical-resistant water-degradable film layer adheres together the windings. The chemical-resistant water-degradable film layer is selected from a material that is resistant to a caustic substance that is to be carried by the carrier and acts as a barrier to substantially prevent the caustic substance from degrading the water-degradable paper layer and leaking out of the tube.

In another aspect a soap stick may include a tube having a first end, a second end, and a hollow interior disposed between the first and second ends. A surfactant is disposed in the hollow interior of the tube. The tube may be formed from a water-degradable material and have overlapping self-adhered windings. The water-degradable material may include a water-degradable paper layer and a chemical-resistant water-degradable film layer that acts as an adhesive when wetted to adhere together the windings. The chemical-resistant water-degradable film layer is selected from a material that is resistant to the surfactant and acts as a barrier to substantially prevent the surfactant from degrading the water-degradable paper layer and leaking out of the tube. An end closure made from the water-degradable material may be disposed at the first or second end of said tube to block the surfactant from escaping therefrom.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
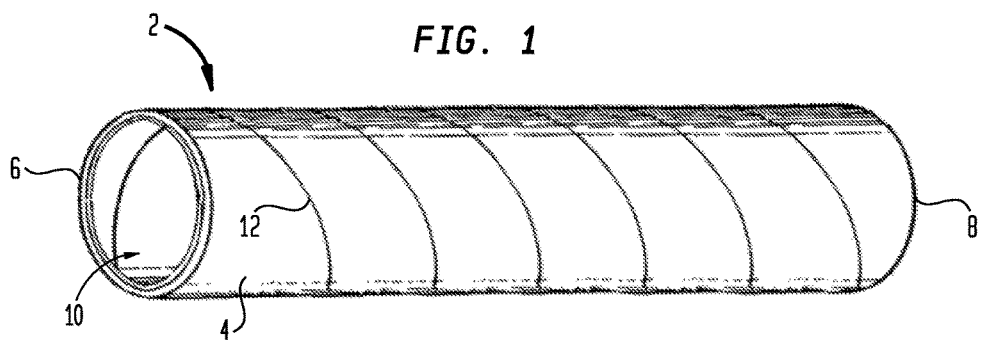
FIG. 1 is a perspective view of an example water-degradable caustic substance carrier that has been constructed in accordance with the present disclosure.

Turning now to the drawing figures, which are not necessarily to scale, like reference numbers are used to represent like elements in all of the several views. FIG. 1 illustrates a water-degradable caustic substance carrier 2 representing one possible embodiment of the present disclosure. The carrier 2 includes a tube 4 having a first end 6, a second end 8, and a hollow interior 10 disposed between the first and second ends. The tube 4 may be formed from a water-degradable material and have one or more overlapping self-adhered windings 12. In the illustrated embodiment of FIG. 1, the windings 12 are spiral in nature, and there is a series of such windings. Thus, the tube 4 according to the illustrated embodiment is a spiral wound tube formed with a series of overlapping self-adhered spiral windings. Other constructions may also be used to form the tube 4, such as a tube having non-spiral windings.

Figure 2:
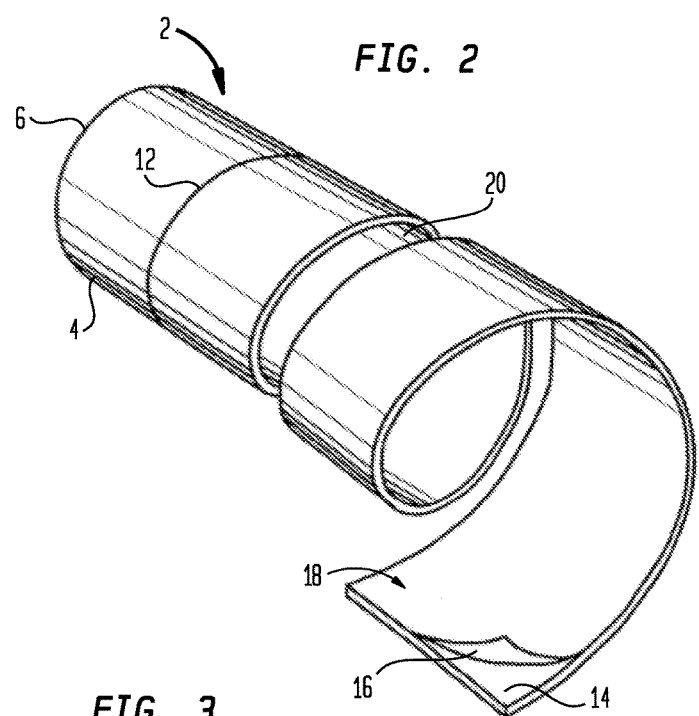
FIG. 2 is a perspective view showing example construction details of the water-degradable caustic substance carrier of FIG. 1.

As shown in FIG. 2, the water-degradable material may include a water-degradable paper layer 14 and a chemical-resistant film (membrane) layer 16 that acts as an adhesive when wetted to adhere together the windings 12. The paper layer 14 may include water-soluble paper. Such paper is available from Aquasol Corporation of North Tonawanda, N.Y. under the trademark Aquasol®. The Aquasol® brand water-soluble paper is made of Sodium Carboxy Methyl cellulose and wooden pulp that dissolves rapidly and completely in most liquids, including water. The sheet thickness of the water-degradable paper may be selected according to the strength and flexibility requirements of the carrier 2. It will be appreciated that the water-degradable paper layer could either be formed as a single layer water-degradable paper material, or could be have two or more sublayers of water-degradable paper material.

The chemical-resistant water-degradable film layer 16 is selected from a material that is resistant to the caustic substance to be carried by the carrier 2 and acts as a barrier to substantially prevent the caustic substance from degrading the water-degradable paper layer 14 and leaking out of the tube 4. The chemical-resistant water-degradable film layer 16 may be formed from a water-soluble polymer, such as a synthetic water-soluble polymer. In an embodiment, the chemical-resistant water-degradable film layer may include a synthetic water-soluble polymer selected from the group consisting of polyvinyl alcohol (PVOH), cellulose ethers, methylcellulose, carboxymethylcellulose, and polyvinylpyrrolidone, depending on the caustic substance to be carried by the carrier 2. For example, applicant has discovered that using a PVOH film layer will substantially prevent the leakage of surfactant through the tube 4 when the tube is manufactured for use as a gas well soap stick. Advantageously, PVOH becomes adhesive when wetted with water to facilitate manufacture of the tube 4 without having to apply a separate adhesive. If desired, the chemical-resistant water-degradable film layer 16 may include a stretchable polymeric film bonded to the water-degradable paper layer. Such material may advantageously help prevent breaking of the water-degradable paper layer during manufacture of the tube 4. Any effective thickness of the chemical-resistant water-degradable film layer 16 may be used, depending on the intended use of the carrier 2 and the caustic substance to be held therein.

The water-degradable paper layer 14 and the chemical-resistant water-degradable film layer 16 may be combined in various ways to form the water-degradable material. One technique is to form the water-degradable material as a laminate of the water-degradable paper layer 14 and the chemical-resistant water-degradable film layer 16. Another technique is to form the water-degradable material as a co-extrusion of the water-degradable paper layer 14 and the chemical-resistant water-degradable film layer 16. A further technique is to apply the chemical-resistant water-degradable film layer 16 as a coating on the water-degradable paper layer 14, and allowing the coating to dry prior to manufacture of the tube 4. Any desired number of water-degradable paper layers 14 and chemical-resistant water-degradable film layers 16 may be provided.

An example method for manufacturing the surfactant carrier will now be described with reference to FIG. 2. The manufacturing method may begin by providing a strip 18 of the above-described water-degradable material having the water-degradable paper layer 14 and the chemical-resistant water-degradable film layer 16. The water-degradable material strip 18 may be arranged on a feed roll that is loaded onto a spiral tube winding machine of conventional design. When tube winding commences, the chemical-resistant water-degradable film layer 16 may be continuously wetted with water (e.g., by dipping, spraying or the like) so that the water-degradable material strip 18 is tacky on one side. This tacky side of the water-degradable material will face toward the hollow interior 10 of the incipient surfactant carrier 2 as the tube 4 is formed. The wetted water-degradable material may be continuously wound on a mandrel of the tube-winding machine to form the tube 4. The spiral windings 12 are wound with overlapping portions 20 so that the windings will be self-adhered to each other by the chemical-resistant water-degradable film layer 16. Advantageously, no separate glue or adhesive is needed, and no additional manufacturing step involving the application of glue or adhesive is required. Such manufacturing step may be completely eliminated.

In an alternate embodiment, the above manufacturing method may be modified by forming an initial set of windings of the water-degradable material strip 18 onto the mandrel of the spiral tube-winding machine without wetting the chemical-resistant water-degradable film layer 16. This may aid in removal of the tube 4 from the mandrel following tube formation, which might otherwise be hindered by the tackiness of the wetted chemical-resistant water-degradable film layer 16. Once the initial set of dry tube windings is formed and the mandrel is no longer exposed, all subsequent windings may be formed with the chemical-resistant water-degradable layer 16 being wetted.

In a further alternate embodiment, the above manufacturing method may be modified by forming an initial set of tube windings using a strip of water-degradable paper only, without the chemical-resistant water-degradable film layer 16 being present. Again, this may aid in removal of the tube 4 from the mandrel following tube formation due to the absence of tacky material that would otherwise be in contact with the mandrel. Once the initial set of paper-only windings is formed and the mandrel is no longer exposed, all subsequent windings may be formed using the water-degradable material strip 18 having the chemical-resistant water-degradable film layer 16, with the film layer 16 being wetted.

Figure 3:
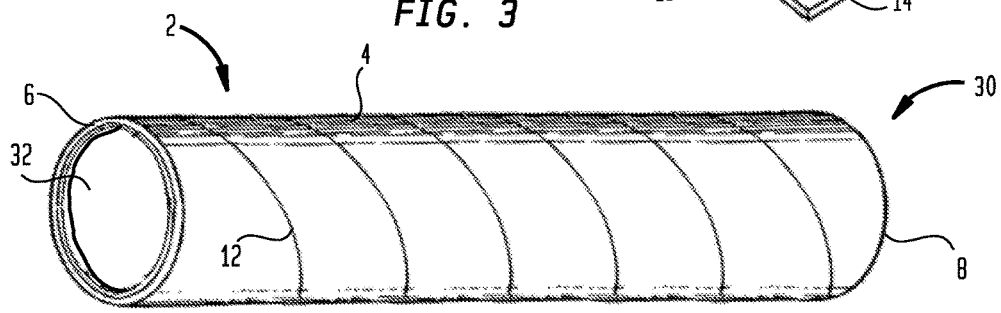
FIG. 3 is a perspective view of showing a soap tube that includes the water-degradable caustic substance carrier of FIG. 1 carrying a surfactant therein.
Figure 4:
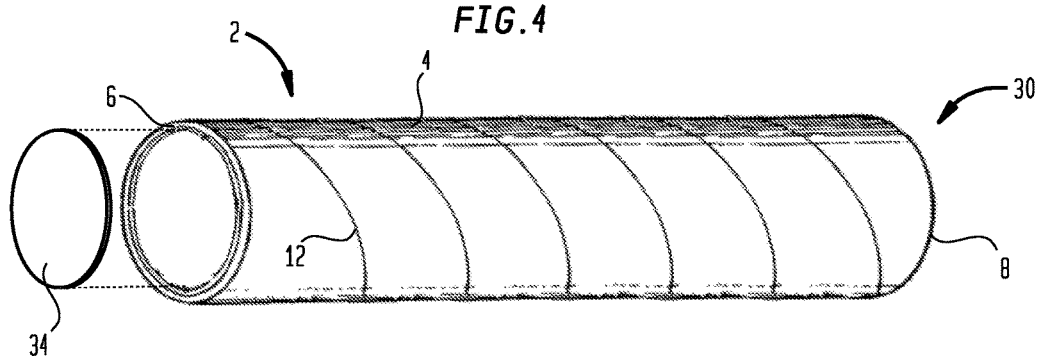
FIG. 4 is a perspective view of the soap tube of FIG. 3 showing an end closure to be installed thereon.
Figure 5:
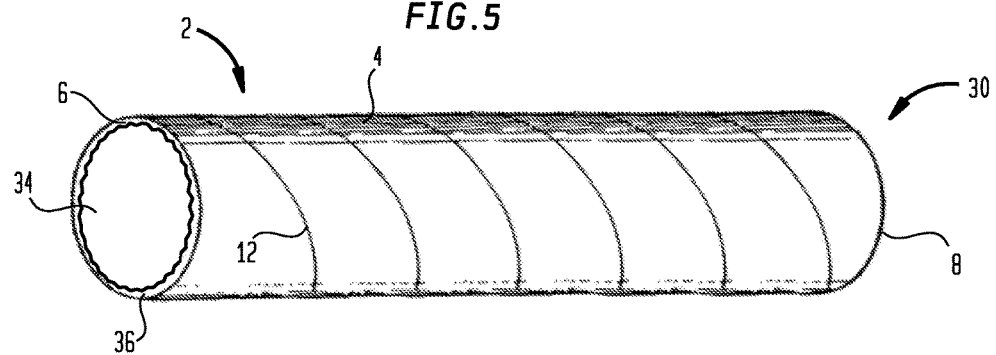
FIG. 5 is a perspective view of the soap tube of FIG. 4 showing the end closure after it has been installed.

Turning now to FIGS. 3-5, the fabrication of a soap stick 30 for gas well use is shown. The soap stick 30 can be made from the carrier 2 described above, with the chemical-resistant water-degradable film layer 16 being made from a material that is chemically resistant to the surfactant, such as PVOH. To form the soap stick 30, a surfactant 32 may be introduced into the hollow interior 10 of the tube 4, preferably in a heat-softened form, and then allowed to cool and harden. To facilitate this process and prevent leakage of the surfactant from the open ends 6 and 8 of the tube 4, one end of the tube may be a closed prior to surfactant introduction by a water-degradable end closure 34.

FIG. 4 illustrates one example end closure 34 that may be formed as a substantially planar circular disk. Regardless of its configuration, the end closure 34, may include the same water-degradable material combination used to form the tube 4, namely a water-degradable material having a water-degradable paper layer and the chemical-resistant water-degradable film layer that substantially prevents leakage of the surfactant through the wall of the end closure. The end closure 34 may be inserted into or over the tube end 6 or 8 at which it is disposed. In the illustrated embodiment of FIG. 4, the end closure 34 is inserted into the tube end 6 and a folding, crimping or other deformation process may be used to deform the tube end so that it retains the end closure at a retention interface. In FIG. 4, reference number 36 illustrates an example retention interface formed by crimping the tube end 6 to the end closure 34.

Once the end closure 34 has been installed, the tube 4 may be stood on its end 6, such that the end closure closes the bottom of the tube's hollow interior 10. The surfactant 32 may then be introduced into the hollow interior 10. To ensure no surfactant leaks from the bottom of the tube 4, it may be desirable to construct the end closure 34 so that its wall thickness is greater than that of the tube itself. However, this is not necessarily a requirement, and the thickness of the end closure 34 may in many cases be the same as (or less than) the tube wall thickness. It will be appreciated that once the surfactant 32 has cooled and hardened within the hollow interior 10, it should remain inside the carrier at room temperature without having to add a second end closure to the opposite end 8 of the tube 4. However, a second end closure may be provided if desired.

Accordingly, a water-degradable caustic substance carrier, a related carrier construction method, and a gas well soap stick have been disclosed. While various embodiments have been described, it should be apparent that many variations and alternative embodiments could be implemented in accordance with the invention. For example, although a surfactant has been disclosed as a representative caustic substance, there are many other caustic substances for which carriers constructed in accordance with the present disclosure could be used. Such caustic substances may include solids in powdered, granular, or other form, or fluids of any viscosity. It is understood, therefore, that the invention is not to be in any way limited except in accordance with the spirit of the appended claims and their equivalents.

What is claimed is:

1. A water-degradable carrier for holding a caustic substance, comprising:
   a tube having a first end, a second end, and a hollow interior disposed between said first and second ends;
   said tube being formed from a water-degradable material and having overlapping self-adhered windings;
   said water-degradable material including a water-degradable paper layer and a chemical-resistant water-degradable film layer;
   said chemical-resistant water-degradable film layer acting as an adhesive when wetted to adhere together said windings; and
   said chemical-resistant water-degradable film layer being selected from a material that is resistant to a caustic substance that is to be carried by said carrier and acts as a barrier to substantially prevent said caustic substance from degrading said water-degradable paper layer and leaking out of said tube.

2. The water-degradable carrier of claim 1, further including an end closure made from said water-degradable material disposed at said first or second end of said tube to block said caustic substance from escaping therefrom.

3. The water-degradable carrier of claim 1, wherein said paper layer comprises water-soluble paper.

4. The water-degradable carrier of claim 1, wherein said chemical-resistant water-degradable film layer comprises a water-soluble polymer.

5. The water-degradable carrier of claim 1, wherein said chemical-resistant water-degradable film layer comprises a synthetic water-soluble polymer selected from the group consisting of polyvinyl alcohol, cellulose ethers, methylcellulose, carboxymethylcellulose, and polyvinylpyrrolidone.

6. The water-degradable carrier of claim 1, wherein said chemical-resistant water-degradable film layer comprises polyvinyl alcohol.

7. The water-degradable carrier of claim 1, wherein said chemical-resistant water-degradable film layer comprises a stretchable polymeric film bonded to said water-degradable paper layer.

8. The water-degradable carrier of claim 1, wherein said water-degradable material comprises a laminate of said water-degradable paper layer and said chemical-resistant water-degradable film layer.

9. The water-degradable carrier of claim 1, wherein said water-degradable material comprises a co-extrusion of said water-degradable paper layer and said chemical-resistant water-degradable film layer.

10. The water-degradable carrier of claim 1, wherein said water-degradable material comprises said water-degradable paper layer coated with said chemical-resistant water-degradable film layer.

11. A method for manufacturing a water-degradable carrier for holding a caustic substance, comprising:
provide a water-degradable material having a water-degradable paper layer and a chemical-resistant water-degradable film layer that acts as an adhesive when wetted;
wetting said chemical-resistant water-degradable film layer to create a wetted water-degradable material that is tacky on one side;
forming said wetted water-degradable material into a wound tube having a first end, a second end, and a hollow interior disposed between said first and second ends;
said tube being having overlapping self-adhered windings of said water-degradable material;
said tacky side of said water-degradable material facing toward said hollow interior so that said chemical-resistant water-degradable film layer adheres together said windings; and
said chemical-resistant water-degradable film layer being selected from a material that is resistant to a caustic substance that is to be carried by said carrier and acts as a barrier to substantially prevent said caustic substance from degrading said water-degradable paper layer and leaking out of said tube.

12. The method of claim 11, further including closing said first or second end of said tube with an end closure made from said water-degradable material to block said caustic substance from escaping said first or second end.

13. The method of claim 11, wherein paper layer comprises water-soluble paper.

14. The method of claim 11, wherein said chemical-resistant water-degradable film layer comprises a water-soluble polymer.

15. The method of claim 11, wherein said chemical-resistant water-degradable film layer comprises a synthetic water-soluble polymer selected from the group consisting of polyvinyl alcohol, cellulose ethers, methylcellulose, carboxymethylcellulose, and polyvinylpyrrolidone.

16. The method of claim 11, wherein said chemical-resistant water-degradable film layer comprises polyvinyl alcohol.

17. The method of claim 11, wherein said chemical-resistant water-degradable film layer comprises a stretchable polymeric film bonded to said water-degradable paper layer.

18. The method of claim 11, wherein said water-degradable material comprises a laminate of said water-degradable paper layer and said chemical-resistant water-degradable film layer.

19. The method of claim 11, wherein said water-degradable material comprises a co-extrusion of said water-degradable paper layer and said chemical-resistant water-degradable film layer.

20. The method of claim 11, wherein said water-degradable material comprises said water-degradable paper layer coated with said chemical-resistant water-degradable film layer.

21. A water-degradable soap stick, comprising:
a tube having a first end, a second end, and a hollow interior disposed between said first and second ends;
a surfactant disposed in said hollow interior of said tube;
said tube being formed from a water-degradable material and having overlapping self-adhered windings;
said water-degradable material including a water-degradable paper layer and a chemical-resistant water-degradable film layer;
said chemical-resistant water-degradable film layer acting as an adhesive when wetted to adhere together said windings;
said chemical-resistant water-degradable film layer being selected from a material that is resistant to said surfactant and acts as a barrier to substantially prevent said surfactant from degrading said water-degradable paper layer and leaking out of said tube; and
an end closure made from said water-degradable material disposed at said first or second end of said tube to block said surfactant from escaping therefrom.

\* \* \* \* \*